(12) United States Patent
Elzur

(10) Patent No.: US 9,282,119 B2
(45) Date of Patent: Mar. 8, 2016

(54) POLICY ENFORCEMENT IN COMPUTING ENVIRONMENT

(71) Applicant: INTEL CORPORATION, Santa Clara, CA (US)

(72) Inventor: Uri Elzur, Irvine, CA (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 13/780,289

(22) Filed: Feb. 28, 2013

(65) Prior Publication Data

US 2014/0137182 A1     May 15, 2014

Related U.S. Application Data

(63) Continuation of application No. 13/675,324, filed on Nov. 13, 2012.

(51) Int. Cl.
| | |
|---|---|
| *G06F 15/16* | (2006.01) |
| *H04L 29/06* | (2006.01) |
| *H04L 29/08* | (2006.01) |
| *G06F 12/00* | (2006.01) |

(52) U.S. Cl.
CPC ............... *H04L 63/20* (2013.01); *H04L 29/06* (2013.01); *H04L 29/08144* (2013.01); *H04L 67/10* (2013.01)

(58) Field of Classification Search
USPC .................. 709/203, 223–229, 250
See application file for complete search history.

(56) References Cited

U.S. PATENT DOCUMENTS

| | | | |
|---|---|---|---|
| 5,692,193 A | 11/1997 | Jagannathan et al. | |
| 6,243,667 B1 | 6/2001 | Kerr | |
| 7,043,659 B1 | 5/2006 | Klein et al. | |
| 8,797,867 B1 | 8/2014 | Chen | |
| 8,848,715 B2 * | 9/2014 | Izenberg et al. | ............. 370/392 |
| 2008/0282253 A1 | 11/2008 | Huizenga | |

(Continued)

FOREIGN PATENT DOCUMENTS

| | | |
|---|---|---|
| WO | 2014/077904 A1 | 5/2014 |
| WO | 2014/117081 A2 | 7/2014 |

OTHER PUBLICATIONS

Apostol, et al., "Policy Based Resource Allocation in Cloud Systems", International Conference on P2P, Parallel, Grid, Cloud and Internet Computing, Oct. 26-28, 2011, pp. 285-288.

(Continued)

*Primary Examiner* — Zarni Maung
(74) *Attorney, Agent, or Firm* — Christopher K. Gagne

(57) ABSTRACT

An embodiment may include policy engine circuitry that may enforce, at least in part, one or more platform resource management policies in a cloud computing environment. The one or more policies may be based, at least in part, upon service arrangements of the cloud computing environment. The one or more policies may establish respective isolated computing environments in the cloud computing environment that may be used by respective users. The enforcement of the one or more policies may result in the respective isolated computing environments being virtually isolated from each other and prevented from interfering with each other in derogation of the one or more policies. The one or more policies may be established, at least in part, via interaction of at least one management process with one or more application program interfaces of the circuitry. Many modifications are possible.

15 Claims, 3 Drawing Sheets

(56) References Cited

U.S. PATENT DOCUMENTS

| | | | |
|---|---|---|---|
| 2010/0211946 A1 | 8/2010 | Elzur | |
| 2010/0223397 A1 | 9/2010 | Elzur | |
| 2010/0275199 A1* | 10/2010 | Smith et al. | 718/1 |
| 2010/0287262 A1 | 11/2010 | Elzur | |
| 2011/0010581 A1 | 1/2011 | Tanttu | |
| 2011/0032944 A1 | 2/2011 | Elzur et al. | |
| 2011/0035498 A1 | 2/2011 | Shah et al. | |
| 2011/0078679 A1 | 3/2011 | Bozek | |
| 2011/0185076 A1 | 7/2011 | Elzur et al. | |
| 2011/0219118 A1 | 9/2011 | Cowan | |
| 2011/0239010 A1 | 9/2011 | Jain et al. | |
| 2011/0243553 A1 | 10/2011 | Russell | |
| 2011/0270968 A1 | 11/2011 | Salsburg et al. | |
| 2011/0292792 A1 | 12/2011 | Zuo | |
| 2011/0320606 A1 | 12/2011 | Madduri et al. | |
| 2012/0016970 A1 | 1/2012 | Shah et al. | |
| 2012/0163180 A1 | 6/2012 | Goel | |
| 2012/0179824 A1 | 7/2012 | Jackson | |
| 2012/0239739 A1 | 9/2012 | Manglik et al. | |
| 2012/0317566 A1* | 12/2012 | Santos et al. | 718/1 |
| 2013/0031240 A1* | 1/2013 | Byzek | 709/224 |
| 2013/0034015 A1 | 2/2013 | Jaiswal et al. | |
| 2013/0086235 A1 | 4/2013 | Ferris | |
| 2013/0091229 A1* | 4/2013 | Dunn et al. | 709/206 |
| 2013/0103834 A1 | 4/2013 | Dzerve | |
| 2013/0124702 A1 | 5/2013 | Shah et al. | |
| 2013/0159999 A1* | 6/2013 | Chiueh et al. | 718/1 |
| 2013/0174157 A1 | 7/2013 | Elzur | |
| 2013/0263125 A1* | 10/2013 | Shamsee et al. | 718/1 |
| 2013/0268646 A1 | 10/2013 | Doron | |
| 2013/0290541 A1* | 10/2013 | Hatasaki et al. | 709/226 |
| 2013/0297769 A1* | 11/2013 | Chang et al. | 709/224 |
| 2013/0339423 A1* | 12/2013 | Degtiarov | 709/203 |
| 2014/0033275 A1 | 1/2014 | Kawamoto | |
| 2014/0119239 A1 | 5/2014 | Hu | |
| 2014/0136706 A1* | 5/2014 | Elzur | 709/226 |
| 2014/0189074 A1 | 7/2014 | Parker | |
| 2014/0215036 A1* | 7/2014 | Elzur | 709/223 |
| 2014/0215465 A1* | 7/2014 | Elzur | 718/1 |

OTHER PUBLICATIONS

International Search Report and Written Opinion received for Patent Application No. PCT/US2013/046123 mailed on Oct. 31, 2013, 9 pages.

Non-final Office Action mailed Dec. 17, 2014 in U.S. Appl. No. 13/751,932, 47 pages.

PCT Publication WO 2014/117081A3, Published Jul. 31, 2014, containing International Search Report for PCT Application No. PCT/US2014/013184, 4 pages.

VMware Information Guide, "VMware Virtual Networking Concepts", Revision: 20070718 Item: In-018-Inf-01-01, 2007, 12 pages.

Notice of Allowance received for U.S. Appl. No. 13/675,324, mailed on Nov. 10, 2014, 15 pages.

International Search Report and Written Opinion received for PCT Patent Application No. PCT/US2014/013184, mailed on Aug. 30, 2014, 9 pages.

Office Action and search report in Chinese Patent Application No. 201380004587.7 dated Dec. 24, 2015 (5 pages, with 5 pages of summarized English translation).

* cited by examiner

FIG. 2

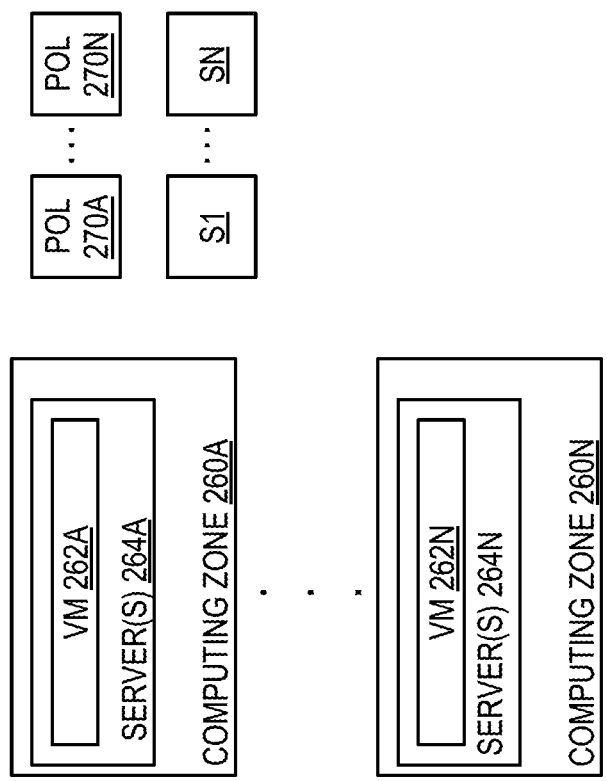

POLICY ENFORCEMENT IN COMPUTING ENVIRONMENT

FIELD

This disclosure relates to policy enforcement in a computing environment.

BACKGROUND

In one conventional arrangement, the resources of a distributed computing system are shared among multiple users. The resources are shared, using virtualization and/or other (e.g., physically-based) techniques, in accordance with usage policies derived from user service agreements. In this conventional arrangement, such usage policies are either set in a centralized fashion by a centralized control mechanism remote from an individual respective computing node in the system, or in a localized fashion by respective localized control mechanisms at each respective computing node, but enforcement may take place at the local computing nodes. In this conventional arrangement, software processes, such as, virtual machine virtual switching (vSwitch) processes, are employed in these mechanisms to control the interaction of virtual machines with various infrastructure components in the system.

Unfortunately, the use of such conventional mechanisms and/or software (e.g., vSwitch) processes may result in excessive, inconsistent, and/or significantly fluctuating central processing unit (CPU) overhead in the computing nodes in the system. This may adversely impact CPU and/or computing node performance (e.g. increased latency and latency variance aka jitter). Additionally, as network bandwidth, network transmission speed, services provided, and/or the number of computing nodes and/or policies in the system increase, it may be difficult to scale the use of such conventional mechanisms and/or software processes, without resulting in undesirably large increases in virtualization processing overhead, risk of network transmission losses, and/or processing latencies.

The above conventional arrangement suffers from additional disadvantages and/or drawbacks. For example, the above conventional system may not be able to provide real time or near real time fine granularity for quality of service adjustments to be made to, and/or provide statistically accurate visibility of workloads and/or resource utilizations, as the workloads and/or utilizations change in and/or among the computing nodes. This is especially true in cases where the adjustments to and/or visibility into such workloads and/or utilizations are to be accomplished on a per user/workload basis in adherence to the user service agreements. Additionally, in this above conventional arrangement, there is no contemplation of integration or close coupling of security processes in the system's infrastructure with security processes in the system's compute and/or storage nodes. These additional disadvantages and/or drawbacks may limit the functionality and/or efficiency of this conventional arrangement, and/or increase its complexity and/or cost to operate and/or implement.

A further drawback of this conventional arrangement is that a significant amount of low level programming (e.g., of many disparate interfaces at each of the system's individual nodes) may be required to program the nodes' individual behaviors to try to make them conform and/or be consistent with, and/or implement, the policies and/or user agreements. This problem can be exacerbated by the different types of infrastructures that may be involved (e.g., compute, network, storage, energy, security resources, etc.), set independently (e.g. via separate scheduler/management mechanisms), and/or may be in conflict or sub-optimal in their operation and/or utilization in the platforms and/or in other shared infrastructure components. As can be readily appreciated, coordinating the programming of these interfaces to make them consistent with the policies and/or service agreements can be quite challenging, especially if, as is often the case, the system's users, nodes, applications, virtual machines, workloads, resources, policies, and/or services change frequently (e.g., as they are added or removed from the system).

One proposed solution that involves processing in hardware of network packets is disclosed in Peripheral Component Interconnect (PCI) Special Interest Group (SIG) Single Root Input/Output Virtualization (SR-IOV) and Sharing Specification Revision 1.1, published Jan. 20, 2010 (hereinafter, "SR-IOV specification"). Unfortunately, this proposed solution effectively eliminates the ability of vSwitch processes to be able to directly affect hardware processed packets. This eliminates the ability to add local control, services, and/or polices to be coordinated with the virtual machine manager and/or vSwitch. This reduces the processing flexibility and/or services in this conventional arrangement, and/or may involve use of SR-IOV hardware to provide all such services (which may be unrealistic).

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which:

FIG. 2 illustrates features in an embodiment.
FIG. 3 illustrates features in an embodiment.

Figure 1:
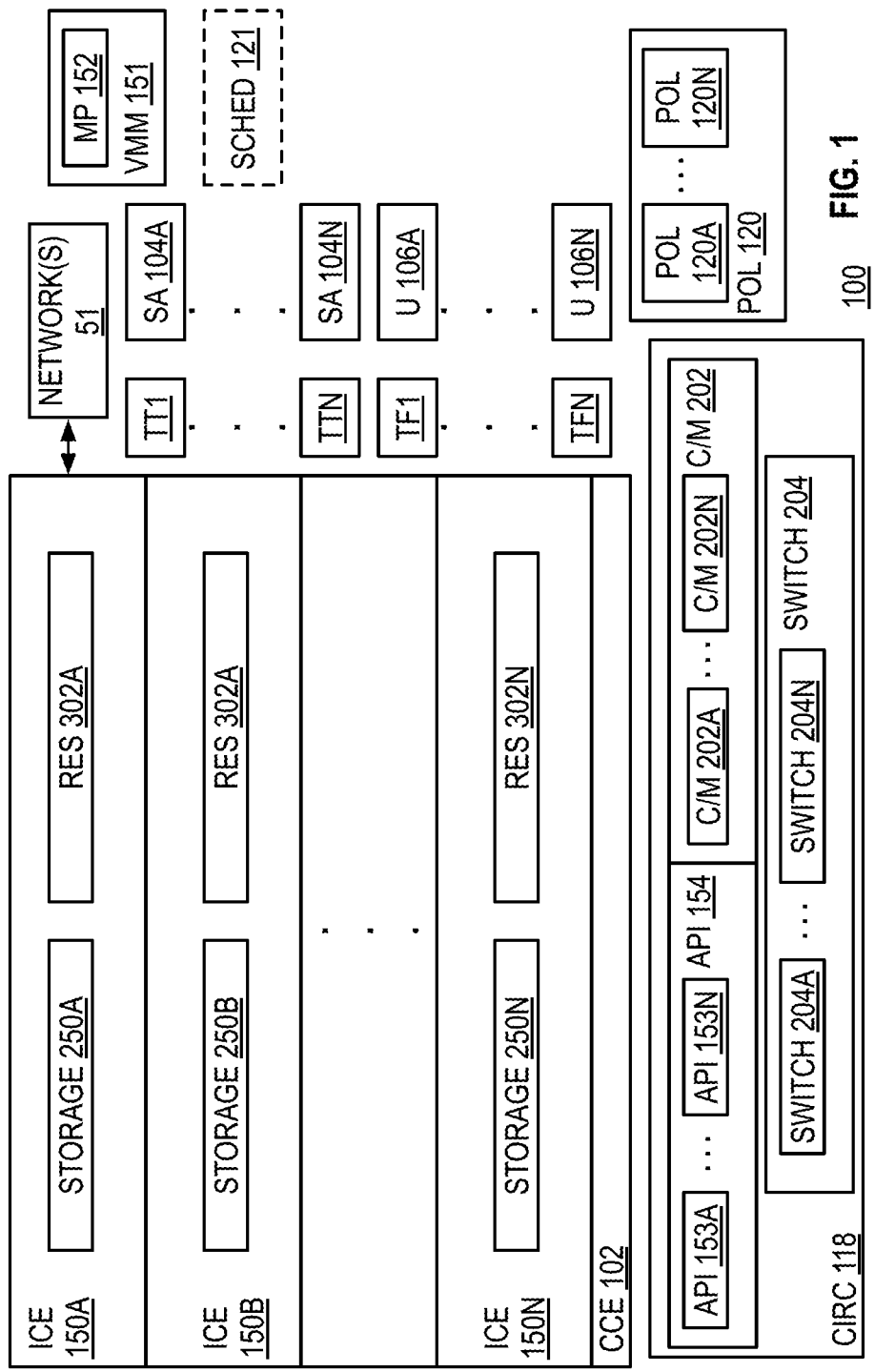
FIG. 1 illustrates a system embodiment.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

FIG. 1 illustrates a system embodiment 100. System 100 may include cloud computing environment (CCE) 102 that may include isolated computing environments (ICE) 150A . . . 150N and/or policy engine circuitry 118. Cloud computing environment may be communicatively coupled to one or more networks 51.

Policy engine circuitry 118 may comprise one or more (and in this embodiment, a plurality of) application programming interfaces (API) 154, one or more (and in this embodiment, a plurality of) protected compute entities and/or memory spaces 202, and/or one or more (and in this embodiment, a plurality of) switches 204. For example, one or more protected memory spaces 202 may comprise a plurality of protected compute entities and/or memory spaces 202A . . . 202N. Also, for example, one or more switches 204 may comprise a plurality of switches 204A . . . 204N. In this embodiment, a protected compute entity and/or protected memory space may be or comprise a processor, memory, and/or one or more portions thereof that may not be exposed, at least in part, to unauthorized access, use, intrusion, and/or inspection by one or more entities (e.g., one or more virtual machine monitor and/or other processes). Although the following description will proceed with reference to the compute entities and/or memory spaces 202 being protected memory spaces, it should be appreciated that one or more of them may be or comprise a compute entity, without departing from this embodiment. Additionally or alternatively, without departing from this embodiment, a protected memory space may be utilized for additional network and/or storage processing, and/or other and/or additional control plane data processing. For instance, such a protected memory space (and/or a separate protected memory space) may be used for temporary storage of a network packet for the purpose of processing, at least in part (e.g., one or more headers, other data, and/or for layers necessary for complete processing), by software to implement, at least in part, a service and/or protocol that hardware may not currently be capable of processing in this fashion.

Policy engine circuitry 118 may enforce, at least in part, one or more platform resource management policies 120 in the cloud computing environment 102. One or more policies may be based, at least in part, upon (e.g., respective) service arrangements 104A . . . 104N with users 106A . . . 106N of the cloud computing environment 102. The one or more policies 120 may be to and/or may result in establishment of the respective isolated computing environments 150A . . . 150N in the cloud computing environment 102. For example, the enforcement, at least in part, of these one or more policies 120 by circuitry 118 may result, at least in part, in respective isolated computing environments 150A . . . 150N being (1) instantiated in cloud computing environment 102, (2) physically and/or virtually isolated from each other, and/or (3) prevented from interfering with each other in derogation of one or more policies 120. Additionally or alternatively, these and/or other features of this embodiment may (1) allow and/or facilitate reporting of per user and per platform resource consumption, (2) support better workload placement based at least in part upon measured/expected resource utilization, and/or (3) may permit matching of available resources with known/measured/expected resources that may be utilized by a new workload to be placed on the platform. These and/or other features may result in reducing and/or minimizing resource conflicts among co-hosted workloads, may increase platform efficiency and/or usefulness, and/or may enhance ability to honor users' service agreements. In this embodiment, the respective isolated computing environments 150A . . . 150N may be used by, intended to be used by, and/or associated with respective of the users 106A . . . 106N. Although description of this embodiment will proceed with reference to the isolated computing environments 150A . . . 150N as being or comprising virtual and/or virtualized entities, without departing from this embodiment, one or more of such environments 150A . . . 150N may be or comprise other types of entities that may virtually isolate non-virtualized entities, such as, for example, multiple application processes executing in a physical machine and/or sharing other and/or additional (e.g., physical) infrastructure (e.g. network and/or storage systems). In this embodiment, such computing environments may implement and/or facilitate, at least in part, for example and without limitation, compute, network, storage, security, energy, audio/video/media, and/or other and/or additional processing and/or services.

The one or more policies 120 may comprise a plurality of platform resource management policies 120A . . . 120N that may be established, at least in part, via interaction of one or more management processes 152 with one or more application program interfaces 154. In this embodiment, one or more processes 152 may be or be comprised, at least in part, in one or more virtual machine managers 151. Alternatively or additionally, however, without departing from this embodiment, one or more processes 152 may not be comprised in, at least in part, one or more virtual machine managers 151 and/or may be centralized (e.g., in one or more centralized management processes/mechanisms 121 in the cloud computing environment 102). For example, mechanisms 121 may be a single, unitary such mechanism in cloud computing environment 102.

In this embodiment, a policy may be and/or comprise, at least in part, (1) one or more rules, instructions, commands, processes, procedures, permissions, and/or interdictions, and/or (2) one or more goals and/or results that may be achieved and/or intended to be achieved as a result, at least in part, of implementing one or more rules, instructions, commands, processes, procedures, permissions, and/or interdictions. Also in this embodiment, enforcement of a policy may comprise, at least in part, implementation and/or execution of (1) one or more rules, instructions, commands, processes, procedures, permissions, and/or interdictions, and/or (2) achievement, at least in part, of one or more goals and/or results.

In this embodiment, a platform may be or comprise one or more physical, logical, and/or virtual computing entities, such as, for example, one or more hosts. Also in this embodiment, the terms host computer, host, server, client, network node, and node may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. In this embodiment, a network may be or comprise any mechanism, instrumentality, modality, and/or portion thereof that permits, facilitates, and/or allows, at least in part, two or more entities to be communicatively coupled together.

In this embodiment, a first entity may be "communicatively coupled" to a second entity if the first entity is capable of transmitting to and/or receiving from the second entity one or more commands and/or data. In this embodiment, data and information may be used interchangeably, and may be or comprise one or more commands (for example one or more program instructions), and/or one or more such commands may be or comprise data and/or information. Also in this embodiment, an instruction may include data and/or one or more commands. In this embodiment, a packet may be or comprise one or more symbols and/or values. In this embodiment, a communication link may be or comprise any mechanism that is capable of and/or permits, at least in part, at least two entities to be or to become communicatively coupled.

In this embodiment, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, policy engine circuitry may be and/or comprise, at least in part, circuitry that is capable, at least in part, of establishing and/or enforcing, and/or of facilitating the establishment and/or enforcement, of one or more policies. In this embodiment, a processor, host processor, central processing unit, processor core, core, and controller each may comprise respective circuitry capable of performing, at least in part, one or more arithmetic and/or logical operations, and/or of executing, at least in part, one or more instructions, such as, for example, one or more (e.g., physical) central processing unit processor cores, microcontrollers, microprocessors, network interface controllers, storage controllers, and/or portions thereof. In this embodiment, a network interface controller may be or comprise circuitry to be communicatively coupled to a network, such as, for example, a network device. Such a network device may be integrated in or distinct from, at least in part, other circuitry in a host. In this embodiment, a chipset may be or comprise, at least in part, circuitry that permits, at least in part, communicative coupling of one or more memories and one or more processors, such as, for example, one or more memory hubs. In this embodiment, memory, cache, and cache memory each may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

In this embodiment, a portion or subset of an entity may comprise all or less than all of the entity. In this embodiment, a set may comprise one or more elements. Also, in this embodiment, a process, thread, daemon, program, driver, operating system, application, kernel, and/or virtual machine monitor each may (1) comprise, at least in part, and/or (2) result, at least in part, in and/or from, execution of one or more operations and/or program instructions.

In this embodiment, a computing environment may be or comprise circuitry capable, at least in part, of being used, alone and/or in combination with one or more other computing environments and/or entities, to perform, at least in part, one or more operations involved in, facilitating, implementing, related to, and/or comprised in one or more arithmetic, Boolean, logical, storage, networking, input/output (I/O), and/or other computer-related operations. In this embodiment, storage may comprise volatile and/or non-volatile memory. In this embodiment, a cloud computing environment may be or comprise a computing environment that is capable of providing one or more computer-related services in accordance with one or more service arrangements. In this embodiment, a service arrangement may be or comprise an agreement and/or contract between at least one entity that is to receive at least one service and at least one other entity that is to provide the at least one service. In this embodiment, a service may comprise one or more functions, operations, instrumentalities, parameters, permissions, guarantees, interdictions, restrictions, limitations, and/or features involving, using, facilitated by, and/or implemented by, at least in part, one or more computing environments. Examples of such services may comprise, without limitations, computational, network, storage, I/O, webhosting, multimedia, video, audio, quality of service, security, power usage, network communication path selection, network congestion avoidance, and/or other services. In this embodiment, a service agreement service may (but is not required to) involve and/or arise out of, at least in part, interaction between one or more users and one or more service provider entities. Such interaction may comprise, at least in part, for example, provision to one or more service provider entities from a user of one or more user applications, virtual machines, executable images, requested user policies, and/or service agreements (e.g., service license agreements). These may be combined, at least in part, by the one or more service provider entities with one or more other policies, terms, and/or conditions of service that may provide greater granularity and/or specifics (e.g., billing and/or infrastructure constraints), and the resulting combination may be enforced, at least in part, as one or more policies, e.g., in the platforms and/or cloud computing environment.

In this embodiment, a user may be, comprise, and/or involve, at least in part, one or more human operators, one or more groups and/or associations of human operators, and/or one or more processes (e.g., application processes) associated with and/or that may be capable of being used directly or indirectly by one or more human operators, one or more groups and/or associations of human operators.

In this embodiment, interaction of a first entity with a second entity may be used interchangeably with interaction between the first and second entities. Also in this embodiment, such interaction may be, comprise, facilitate, and/or involve, at least in part, (1) provision, initiation of provision, and/or request for provision of one or more signals, commands, and/or data to the second entity by the first entity, and/or (2) one or more actions and/or changes in state of the second entity in response, at least in part, thereto.

For example, in this embodiment, service arrangements 104A . . . 104N may be or comprise respective contracts between respective of the users 106A . . . 106N (on the one side) and one or more entities (on the other side) that may maintain, operate, and/or own, at least in part, the cloud computing environment 102. These contracts may specify the respective sets of services and/or parameters of the respective sets of services that are to be provided to the users 106A . . . 106N in the cloud computing environment 102. Policies 120A . . . 120N may be based, at least in part, upon these service arrangements 104A . . . 104N and/or contracts such that, the enforcement, at least in part, of these policies 120A . . . 120N may result, at least in part, in the provision of these respective services to the users 106A . . . 106N in accordance with the users' respective service arrangements 104A . . . 104N and/or the parameters thereof.

For example, the enforcement, at least in part, of the policies 120A . . . 120N by circuitry 118 may result in the instantiation of isolated computing environments 150A . . . 150N in cloud computing environment 102. As instantiated, these isolated computing environments 150A . . . 150N may be mutually, virtually isolated from each other, and/or may provide respective sets of services to the respective of the users 106A . . . 106N that may be associated with the environments 150A . . . 150N (e.g., as per their respective service arrangements). In this embodiment, virtual isolation between a first computing environment and a second computing environment may result in the respective users of these environments using the respective sets of resources that may be associated with and/or comprised in these respective computing environments in ways that (1) may be (e.g., wholly) consistent with and/or (e.g., completely) not in derogation of the respective service agreements of the respective users, and/or (2) may not interfere (e.g., in a user-meaningful and/or user-appreciable manner) with the respective uses of resources that may be shared, at least in part, in the environments.

For example, environment 150A may comprise and/or be associated, at least in part, with storage 250A, and/or one or more resources 302A. Environment 150B may comprise and/or be associated, at least in part, with storage 250B and/or one or more resources 302A. Environment 150N may comprise and/or be associated, at least in part, with storage 250N and/or one or more resources 302N. The enforcement by circuitry 118 of the respective policies 120A . . . 120N (and, e.g., in particular, at least policies 120A, 120B, 120N) may result, at least in part, in environments 150A, 150B, 150N being mutually, virtually isolated from each other (and the other isolated computing environments comprised in environments 150A . . . 150N). For example, environments 150A, 150B, 150N may be virtually isolated from each other such that the respective users 106A, 106B, 106N of these environments 150A, 150B, 150N may be only permitted to use their respective sets of resources (e.g., resources 302A and 302N, and/or storage 250A, 250B, 250N) in ways that (1) may be (e.g., wholly) consistent with and/or (e.g., completely) not in derogation of the respective service agreements 104A, 104B, 104N of the respective users 106A, 106B, 106N, and/or (2) may not result in user-meaningful and/or user-appreciable interference with respect to shared resources (e.g., shared resources 302A).

In this embodiment, one or more application program interfaces 154 may comprise a plurality of application program interfaces 153A . . . 153N. In this embodiment, an application program interface may be or comprise one or more physical, logical, and/or virtual interfaces via which (1) a first entity provide data and/or one or more signals, commands, instructions to a second entity that may permit and/or facilitate, at least in part, control, monitoring, and/or interaction, at least in part, with the second entity, and/or (2) the second entity may provide other data and/or one or more other signals that may permit and/or facilitate, at least in part, such control, monitoring, and/or interaction, at least in part (e.g. concerning, comprising, and/or related to, at least in part, one or more available resources, resource usage, service agreement violations, etc.). In this embodiment, one or more application program interfaces 154 and/or one or more of interfaces 153A . . . 153N may comprise (in whole or in part) embedded hardware and/or firmware in multiple hardware components of hosts that may comprise and/or be comprised in, at least in part, cloud computing environment 102. Of course, many alternatives are possible without departing from this embodiment.

In this embodiment, advantageously, one or more application program interfaces 154 and/or interfaces 153A . . . 153N may permit coordination, at least in part, (in a manner not contemplated in conventional techniques) of the programming of the policies 120 and/or 120A . . . 120N for different aspects of the services and/or infrastructure comprising and/or implemented in environment 102. Advantageously, this may obviate deleterious and/or sub-optimal performance that may result if and/or when, for example, a cloud computing environment comprises separate control planes that may be used to separately program these different aspects of the services and/or infrastructure comprised and/or implemented in the cloud computing environment. For example, if different respective control planes are used to program compute resources and energy resources, it may be difficult and/or challenging to avoid conflicting programming of such resources (e.g. the compute resources may be programmed to be used contemporaneously with the powering off of such resources).

Further advantageously, in this embodiment, one or more application program interfaces 154 and/or interfaces 153A . . . 153N may permit programming abstraction of a kind that is not contemplated in conventional techniques. For example, one or more interfaces 154 and/or one or more interfaces 153A . . . 153N may abstract the details of low level implementation, while still permitting low level fine tuning, of policies 120 and/or 120A . . . 120N, so as to greatly ease and simplify programming and/or implementation of policies 120 and/or 120A . . . 120N, while permitting cloud environment 102 to be able achieve much greater (and/or substantially optimal) performance. For example, one or more application program interfaces 154 and/or interfaces 153A . . . 153N may permit programming of CPU core power states on a service agreement-by-service agreement basis, while avoiding the need of the cloud environment's control plane to follow the details of the hardware's actual implementation and/or of changes from one generation to another. In this embodiment, circuitry 118 and/or CCE 102 may be programmed with the identities of the users of the respective components of the CCE 102 and/or other infrastructure associated therewith, and/or of associated policies. Advantageously, this may allow a given application program interface to be utilized over multiple various hardware generations, without involving the cloud environment's control plane (which utilizes the API) with the changing lower level details, while allowing exposure and utilization of new and emerging lower level hardware features, thereby improving utilization, efficiency and/or service agreement effectiveness in the environment 102.

Figure 2:
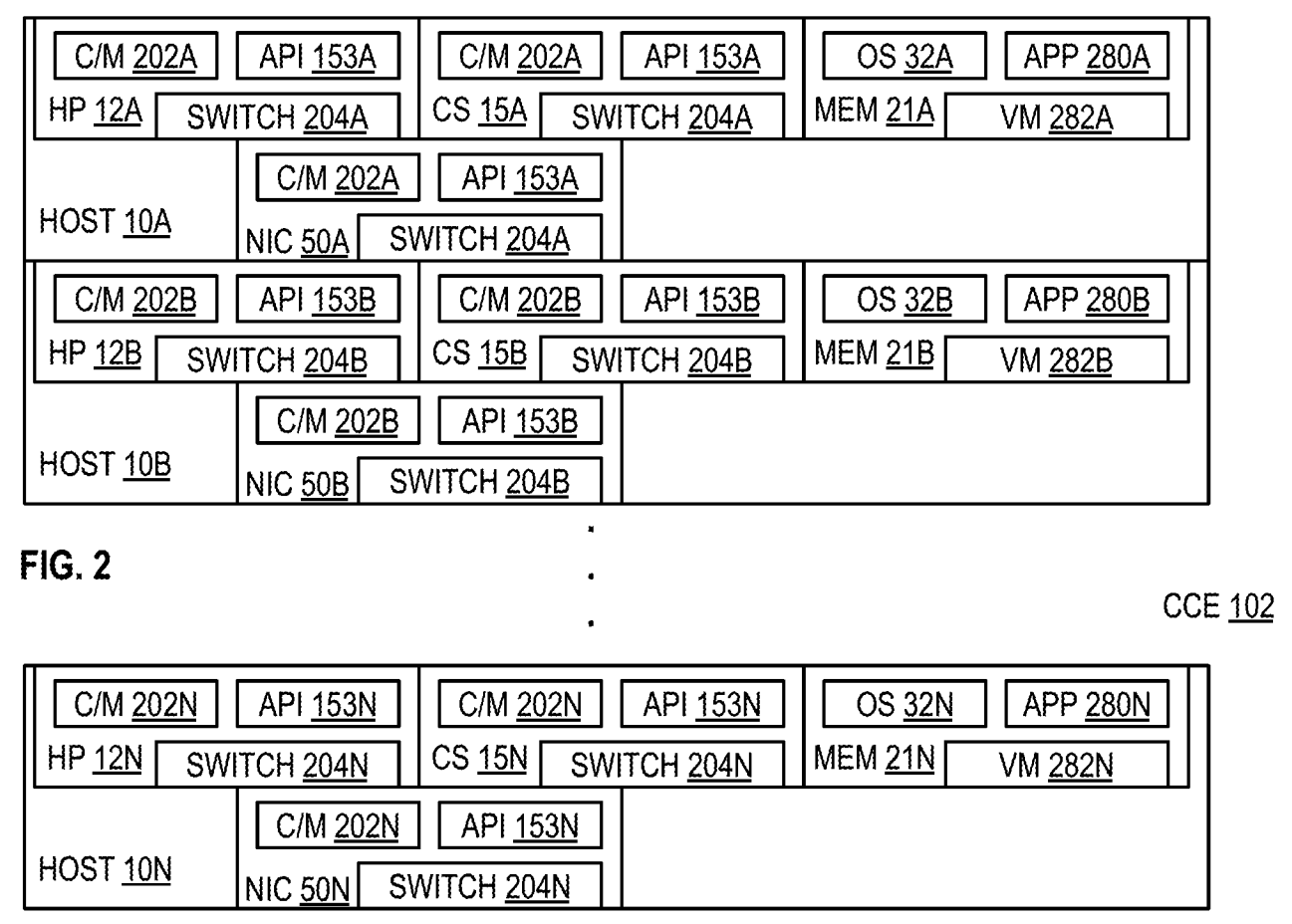

For example, as shown in FIG. 2, cloud computing environment 102 may comprise one or more (and in this embodiment, a plurality of) hosts 10A . . . 10N. Depending upon the particular respective configurations of and/or operations performed by hosts 10A . . . 10N (and/or by the respective components of hosts 10A . . . 10N), hosts 10A . . . 10N may be configured and/or operate in such a way as to provide, at least in part, the respective particular functionality, services, and/or operations that are to be provided to the users 106A . . . 106N pursuant to and/or in accordance with their respective service arrangements 104A . . . 104N. Thus, depending upon the particular respective configurations of and/or operations performed by hosts 10A . . . 10N (and/or by the respective components of hosts 10A . . . 10N), hosts 10A . . . 10N may be configured and/or operate in such a way as to enforce, at least in part, policies 120A . . . 120N and/or 120 and/or to establish, at least in part, respective isolated computing environments 150A . . . 150N such that the environments 150A . . . 150N may be virtually isolated from each other and may be prevented from interfering with each other in derogation of the policies 120A . . . 120N and/or 120.

For example, each of the hosts 10A . . . 10N may comprise respective hardware components. These respective hardware components in each respective host may comprise one or more respective host processors (HP), one or more respective chipsets (CS), one or more respective memories, and/or one or more respective network interface controllers (NIC). A respective one of the application program interfaces 153A . . . 153N, protected memory spaces 202A . . . 202N, and/or switches 204A . . . 204N may be comprised, replicated, and/or distributed in, at least in part, one or more of the respective host processors, chipsets, storage controllers, management resources, other shared or shareable hardware resources, and/or network interface controllers in each respective host. For example, host 10A may comprise one or more respective host processors 12A, one or more respective chipsets 15A, one or more respective memories 21A, and/or one or more respective network interface controllers 50A. Host 10B may comprise one or more respective host processors 12B, one or more respective chipsets 15B, one or more respective memories 21B, and/or one or more respective network interface controllers 50B. Host 10N may comprise one or more respective host processors 12N, one or more respective chipsets 15N, one or more respective memories 21N, and/or one or more respective network interface controllers 50N.

As stated previously, a respective one of the application program interfaces 153A . . . 153N, protected memory spaces 202A . . . 202N, and/or switches 204A . . . 204N may be comprised, replicated, and/or distributed in, at least in part, one or more of the respective host processors, chipsets, and/or network interface controllers in each respective host. Thus, for example, in host 10A, one or more host processors 12A, one or more chipsets 15A, and/or one or more network interface controllers 50A may comprise (in whole or in part) one or more respective application program interfaces (collectively or singly referred to by block 153A), one or more respective protected memory spaces (collectively or singly referred to by block 202A), and/or one or more switches (collectively or singly referred to by block 204A). In this embodiment, the one or more application program interfaces 153A, one or more protected memory spaces 202A, and/or one or more switches 204A may be constituted wholly (or at least partially) as hardware and/or firmware. Of course, without departing from this embodiment, some or all of these components may comprise, at least in part, one or more respective software components.

In this embodiment, one or more scheduling mechanisms 121 may be distributed, at least in part, in and/or among one or more various hosts (e.g., servers) and/or services in CCE 102, and/or elsewhere. In this arrangement, the one or more scheduling mechanisms 121 may be placed adjacent (e.g., physically, logically, and/or virtually) components, services, resources, etc. that may be subject to scheduling by the one or more scheduling mechanisms 121. Alternatively, without departing from this embodiment, one or more scheduling mechanisms 121 may be comprised in a unified scheduling mechanism. In either arrangement, the one or more schedulers 121 may receive from these components, services, resources, etc. information related to and/or indicating their current respective statuses, operational characteristics, workloads, users, etc., and may utilize such information in making scheduling decisions. Such close collaboration and/or coordination of policies for various aspects of the infrastructure on the platforms in CCE 102 may permit and/or facilitate better scheduling coordination (e.g., in allocating/placing/scheduling use of the infrastructure resources). Additionally, the foregoing use of adjacency may reduce and/or minimize the risk that resources that may be utilized in close proximity in time may be placed relatively far away from each other and/or be subject to related communication bandwidth limitations.

Also, for example, in host 10B, one or more host processors 12B, one or more chipsets 15B, and/or one or more network interface controllers 50B may comprise (in whole or in part) one or more respective application program interfaces (collectively or singly referred to by block 153B), one or more respective protected memory spaces (collectively or singly referred to by block 202B), and/or one or more switches (collectively or singly referred to by block 204B). In this embodiment, the one or more application program interfaces 153B, one or more protected memory spaces 202B, and/or one or more switches 204B may be constituted wholly (or at least partially) as hardware and/or firmware. Of course, without departing from this embodiment, some or all of these components may comprise, at least in part, one or more respective software components.

Also, for example, in host 10N, one or more host processors 12N, one or more chipsets 15N, and/or one or more network interface controllers 50N may be programmed collectively for service agreement adherence using (in whole or in part) one or more respective application program interfaces (collectively or singly referred to by block 153N), one or more respective protected memory spaces (collectively or singly referred to by block 202N), and/or one or more switches (collectively or singly referred to by block 204N). In this embodiment, the one or more application program interfaces 153N, one or more protected memory spaces 202N, and/or one or more switches 204N may be constituted wholly (or at least partially) as hardware and/or firmware. Of course, without departing from this embodiment, some or all of these components may comprise, at least in part, one or more respective software components.

In this embodiment, the application program interfaces 153A . . . 153N and/or 154 may permit one or more management processes 152 and/or VMM processes 151 (and/or one or more not shown vSwitch processes, if present in the system 100) to be able to (1) identify presence and capabilities of relevant circuitry (e.g., in CCE 102), and/or to coordinate use of same, and/or (2) provide one or more authorized commands and/or data to circuitry 118 via the interfaces 153A . . . 153N and/or 154. This may result, at least in part, in circuitry 118 controlling, monitoring, and/or modifying, at least in part, the respective configurations and/or operations of, and/or data stored in, one or more of the protected memory spaces 202A . . . 202N and/or 202, switches 204A . . . 204N and/or 204, host processors 12A . . . 12N, chipsets 15A . . . 15N, and/or hosts 10A . . . 10N in a manner that fully and completely implements (and/or does not in any way derogate or contradict), at least in part, the policies 120A . . . 120N. Similarly, the provision of such one or more authorized commands and/or data via one or more interfaces 154 and/or 153A . . . 153N may result, at least in part, in circuitry 118 modifying (in an authorized manner) one or more of the policies 120A . . . 120N (and/or one or more corresponding configurations and/or operations of the foregoing components of environment 102) so as to give effect to and/or implement one or more authorized changes to one or more of the service arrangements 104A . . . 104N if they occur. The policies 120A . . . 120N and/or 120 may define policies for each of the respective isolated computing environments 150A . . . 150N that may be related to, implement, involve, arise out of, and/or facilitate, at least in part, for example, maximum or minimum permitted, agreed upon, and/or acceptable levels of host/host processor workload, workload sharing, quality of service, security, power usage, storage, storage management features, I/O service, I/O service management features, network congestion avoidance, and/or control plane programming coordination and/or abstraction described above (e.g., on a service agreement-by-service agreement basis). Alternatively or additionally, policies 120A . . . 120N and/or 120 may define policies for each of the respective isolated computing environments 150A . . . 150N that may be related to, implement, arise out of, and/or facilitate, at least in part, for example, such control plane programming coordination and/or abstraction. For example, if, a given workload has been placed on one or more of the hosts 10A . . . 10N, but thereafter, one or more of the policies 120 and/or 120A . . . 120N cannot be satisfied or fully implemented by these one or more hosts 10A . . . 10N, circuitry 118 may adjust (e.g., by notifying the respective control planes of the one or more hosts 10A . . . 10N in an integrated and/or coordinated fashion), in accordance with these policies 120 and/or 120A . . . 120N the placement of the workload so as to more fully satisfy and/or implement such policies 120 and/or 120A . . . 120N.

Also, advantageously, in this embodiment, circuitry 118, in accordance with these policies 120 and/or 120A . . . 120N, may coordinate and/or control (in event of conflict and/or in other situations) communication and/or network path selection (e.g., to be used when communicating via one or more networks 51). For example, if multiple such paths may be available, these may be selected and/or changed by circuitry 118 and/or directly by one or more such hosts 10A . . . 10N (e.g., by notifying a central control plane of such conflict, for example, in one or more given hosts or in network infrastructure). This may select and/or change the manner that sharing of resources may be carried out and/or implemented, and/or other parameters.

For example, by appropriating configuring and/or operating the switches 204A . . . 204N and/or 204, and/or protected memory spaces 202A . . . 202N in accordance with the policies 120A . . . 120N and/or 120, it may be possible to provide individual hardware-enforced virtual communication circuit paths and/or private memory spaces that may be used to allocate and/or isolate use and/or provision of services to and/or among hosts 10A . . . 10N and/or multiple virtual machine (VM) processes 282A . . . 282N, operating system processes 32A . . . 32N, users 106A . . . 106N, and/or user application processes 280A . . . 280N that may be resident in host system memory 21A . . . 21N so as to provide the respective isolated computing environments 150A . . . 150N in the manner previously discussed. Additionally, by so doing, it may also be possible to restrict and/or permit access (at a hardware level) to network connectivity, services, storage, and/or I/O in the cloud computing environment 102 by hosts 10A . . . 10N and/or multiple virtual machine processes 282A . . . 282N, operating system processes 32A . . . 32N, users 106A . . . 106N, and/or user application processes 280A . . . 280N, in a secure fashion, with reduced (in some cases, near zero) host processor software processing overhead. Also it may be possible to couple a secure host with another over shared networking infrastructure, to extend the host security domain for the purpose of securely sharing data, sharing security services, controlling the location of data or location of processing and for a potential elimination of the need for independent networking or storage security deployment, disjoint from the host security, thus reducing total cost of ownership. Also, advantageously, these virtual circuit communication paths and/or private memory spaces may be established and/or enforced at a hardware level (e.g., instead of at and/or via a software level in the case of a virtual switch), thereby improving security and processing speed in this embodiment. Of course, such communication paths and/or private memory spaces may not be statically allocated and/or determined, but instead may be dynamically allocated and/or determined, or further alternatively, may be allocated and/or determined in some combination of static and/or dynamic allocations. Many variations are possible without departing from this embodiment.

For example, advantageously, in this embodiment, interfaces 153A . . . 153N and/or 154 may constitute common programming interfaces that may allow direct programming of each, one or more, and/or all, of the environments 150A . . . 150N, hosts 10A . . . 10N, resources and/or storage comprised in the cloud computing environment 102. Such programming may be carried out via any of these interfaces 153A . . . 153N and/or 154. Advantageously, this may provide a common, centralized, and/or unified programming interface that may be used by one or more authorized processes (e.g., VMM, management, and/or not shown vSwitch processes) to set and/or apply universal, consistent, and/or wholly coordinated policies through the system 100 and each and every node and/or resource therein. This may permit conflict-free (or substantially conflict-free) sharing of physical and/or virtual resources in the system 100 that otherwise (e.g., by their very nature) may be in conflict among themselves and/or various workloads in one or more of the hosts.

Further advantageously, in this embodiment, after the policies have been programmed via one or more of the interfaces 153A . . . 153N and/or 154, implementation and/or enforcement of the policies may be carried out entirely (or substantially) by hardware (e.g., circuitry 118). However, the degree to which such policies may be enforced and/or implemented by hardware may itself by established and/or specified by the policies. This may offload the enforcement and/or implementation of such policies from the VMM, management, and/or vSwitch processes to hardware, while still permitting such processes to specify, change, adapt, and/or ultimately control such enforcement and/or implementation. Advantageously, this may permit this embodiment to exhibit and/or offer (1) flexibility and/or services akin to (or better than) that exhibited and/or offered by systems in which policy enforcement and/or implementation is carried out by software (e.g., by vSwitch processes) and (2) performance akin to (or better than) that exhibited and/or offered by systems that employ the SR-IOV specification.

In particular, the flexibility and centralized programming/control offered in this embodiment may be superior to that offered by systems that employ vSwitch, especially, if modification to the policies is desirable, for example, if the system's users, nodes, applications, virtual machines, workloads, resources, policies, and/or services change (e.g., as they are added or removed from the system). In this situation, one or more authorized processes (e.g., VMM, management, and/or not shown vSwitch processes) may re-program, at least in part, one or more of the policies to reflect such changes, via one or more interfaces 153A . . . 153N and/or 154. Alternatively or additionally, without departing from this embodiment, one or more not shown processes and/or program extensions resident and/or executing in one or more of the compute entities and/or memory spaces 202A . . . 202N may re-program, at least in part, via one or more interfaces 153A . . . 153N and/or 154, one or more of the policies to reflect such changes. If such changes occur while one or more of the hosts involved in resulting workload changes are operating (e.g., in the case of hot migration), the policies may be adjusted, at least in part, to reflect new accumulated and/or individual workload (and/or other) requirements and/or to influence to which of the hosts the workloads may be distributed (e.g., in order to optimize resource utilization and/or compliance with the service agreements).

Additionally, interfaces 153A . . . 153N and/or 154, memory spaces 202A . . . 202N and/or 202, and/or switches 204A . . . 204N and/or 204 may be protected against unauthorized operating system and/or virtual machine/process interaction. For example, if one or more operating system processes 32A . . . 32N, virtual machine processes 282A . . . 282N, application processes 280A . . . 280N, VMM processes 151, and/or management processes 152 attempt to make (via one or more interfaces 154) one or more unauthorized changes to one or more of the policies 120A . . . 120N and/or 120, and/or to the respective configurations and/or operations of one or more of the switches 204A . . . 204N, 204, and/or memory spaces 202A . . . 202N, 202, one or more interfaces 154 and/or circuitry 118 may reject the one or more unauthorized changes. In this embodiment, an unauthorized change may comprise a change that may be (1) contrary to one or more permissions and/or parameters established by an administrator, and/or (2) not verified to be in accordance with such permissions and/or parameters. Such permissions and/or parameters may comprise, for example, global (e.g., cloud computing environment-wide) resource and/or policy conflict resolution/usage rules that may ensure that policies and/or policy changes may not conflict with each other, may be in accordance with the capabilities of the cloud computing environment, etc. Additionally or alternatively, in this embodiment, such permissions and/or parameters may prevent and/or reject change to a given policy (and/or, e.g., addition of one or more workloads, applications, VM, etc.) if that change would negatively affect one or more current service agreement commitments.

Additionally or alternatively, in this embodiment, only a trusted entity (e.g., circuitry 118, a virtual machine manager, and/or one or more associated control processes (e.g., one or more scheduling/management mechanisms 121 shown in FIG. 1)) may be capable of modifying one or more policies 120 and/or 120A ... 120N. Accordingly, in this embodiment, a given user and/or virtual machine may be disabled (as being untrusted) from being able to modify one or more policies 120 and/or 120A ... 120N. Thus, if such an arrangement is present in this embodiment, the policies 120 and/or 120A ... 120N may be stored in a single protected memory space, for example, in a single one of the hosts 10A ... 10N. In this embodiment, one or more mechanisms 121 may be or comprise, at least in part, one or more processes that may be executed, at least in part, by, for example, circuitry 118 and/or one or more components (e.g., one or more host processors and/or other resources) comprised, at least in part, in cloud environment 102 and/or one or more of the hosts 10A ... 10B. Alternatively or additionally, one or more mechanisms 121 may be comprised (in whole or in part) in or by hardware (e.g., circuitry 118).

Various advantageous usage models may be contemplated by this embodiment. For example, by appropriately controlling circuitry 118 and/or one or more components thereof via one or more interfaces 154 in the above manner, one or more respective transmissions TT1 ... TTN of one or more respective packets from one or more networks 51 to one or more respective of the computing environments 150A ... 150N may be permitted to occur (or denied from occurring), at least in part. This permission may be granted (or denied as the case may be) on a transmission-by-transmission (and/or alternatively or additionally on CPU core-by-CPU core, source-by-source, packet-by-packet, flow-by-flow, isolated computing environment-by-isolated computing environment, etc.) basis, based at least in part upon (1) whether the one or more respective of the environments 150A ... 150N that are destined (e.g., as addressed by the respective transmission) to receive the one or more respective transmissions TT1 ... TTN are authorized for same (e.g., for and/or to receive the one or more respective transmissions TT1 ... TTN) by the one or more policies 120A ... 120N and/or 120, and/or (2) inspection of such packets, flows, and/or transmissions by circuitry 118 and/or one or more components thereof for comparison to the parameters of the one or more such policies.

Additionally or alternatively, by appropriately controlling circuitry 118 and/or one or more components thereof via one or more interfaces 154 in the above manner, one or more respective transmissions TF1 ... TFN of one or more respective packets from one or more respective of the computing environments 150A ... 150N to one or more networks 51 may be permitted to occur (or denied from occurring), at least in part. This permission may be granted (or denied as the case may be) on a transmission-by-transmission (and/or alternatively or additionally on CPU core-by-CPU core, destination-by-destination, packet-by-packet, flow-by-flow, isolated computing environment-by-isolated computing environment, etc.) basis, based at least in part upon (1) whether the one or more respective of the environments 150A ... 150N from which the one or more respective transmissions TF1 ... TFN are being transmitted, may be authorized for same (e.g., for and/or to issue the one or more respective transmissions TF1 ... TFN) by the one or more policies 120A ... 120N and/or 120, and/or (2) inspection of such packets, flows, and/or transmissions by circuitry 118 and/or one or more components thereof for comparison to the parameters of the one or more such policies.

Additionally or alternatively, without departing from this embodiment, the grant or denial of the permission for one or more of the transmissions TT1 ... TTN and/or TF1 ... TFN may be delayed, reprioritized, and/or rescheduled, at least in part, in accordance with one or more policies 120A ... 120N and/or 120. Further additionally or alternatively, one or more of the transmissions TT1 ... TTN and/or TF1 ... TFN may be issued, at least in part, to one or more protected memory spaces for additional processing (e.g., for services not currently available in the hardware transmission pipeline, such as, security and/or a tunneling mechanism) in accordance with one or more policies 120A ... 120N and/or 120. After such processing, one or more of the transmissions TT1 ... TTN and/or TF1 ... TFN may be delivered to one or more vSwitch processes, and/or may sent to one or more protected memory spaces, and thence, to the to circuitry 118 for delivery to one or more VM or applications.

Other advantageous usage models are also possible. For example, when enforced by appropriately controlling circuitry 118 and/or one or more components thereof via one or more interfaces 154 in the above manner, one or more policies 120A ... 120N and/or 120 may establish and/or define, at least in part, one or more (and in this embodiment, a plurality of) virtual computing zones 260A ... 260N in cloud computing environment 102 (see FIG. 3). Each of the respective computing zones 260A ... 260N may comprise one or more respective servers 264A ... 264N that may comprise one or more respective virtual machines 262A ... 262N. These one or more respective servers 264A ... 264N and/or virtual machines 262A ... 262N may provide one or more respective services (e.g., within the cloud environment 102 and/or via one or more networks 51 to one or more not shown service recipients outside the environment 102) Si ... SN. In this usage model of this embodiment, these one or more respective services Si ... SN may be managed, controlled, monitored, and/or established, at least in part, in accordance with and/or based upon, at least in part, one or more respective policies 270A ... 270N. These one or more respective policies 270A ... 270N may be established in and/or for, and/or may be associated with each of the respective zones 260A ... 260N, and/or may be in addition to and/or other than policies 120. Advantageously, this may permit virtual computing zones 260A ... 260N to be implemented in environment 102 (e.g., using the components of hosts 10A ... 10N) that may implement and/or provide services inside or outside of the environment 102, based at least in part upon one or more policies 270A ... 270N that may be distinct and/or managed separately from other policies 120 that may be used to define and/or establish the cloud environment's users' environments 150A ... 150N.

In this embodiment, although FIG. 3 illustrates that a server may comprise one or more virtual machines, alternatively without departing from this embodiment, a virtual machine may reside, at least in part, in multiple servers. Many alternatives are possible without departing from this embodiment.

Thus, an embodiment may include policy engine circuitry that may enforce, at least in part, one or more platform resource management policies in a cloud computing environment. The one or more policies may be based, at least in part, upon service arrangements (e.g., with users) of the cloud computing environment. The one or more policies may establish respective isolated computing environments in the cloud computing environment that may be used by respective of the users. The enforcement of the one or more policies may result in the respective isolated computing environments being virtually isolated from each other and prevented from interfering with each other in derogation of the one or more policies. The one or more policies may be established, at least in part, via interaction of at least one management process with one or more application program interfaces of the circuitry. The enforcement of the one or more policies may also result, at least in part, in (1) the assignment, at least in part, of one or more workloads in the cloud computing environment, (2) the coordination, at least in part, of resource allocation in the cloud computing environment, and/or (3) the coordinating, at least in part, of the resource allocation by one or more scheduling mechanisms (e.g., one or more scheduling mechanisms 121, or a single scheduling mechanism) in the cloud computing environment. The one or more workloads may be associated, at least in part, with the one or more policies, and/or the assignment of the one or more workloads may be based, at least in part, upon the one or more policies and/or feedback information of the cloud computing environment.

In this embodiment, the one or more policies may be established on and/or via one or more physical hosts, via interaction with one or more cloud environment scheduling, management, and/or enforcement mechanisms (e.g., mechanism 121). When enforced and/or implemented, such policies may be capable of establishing, providing, and/or affecting the cloud's infrastructure and/or services (e.g. network devices, storage devices, etc.), and/or may result in (1) gathering of feedback information (e.g., resource usage, availability, and/or resource/policy conflict/contention information) from infrastructure, resources, hosts, and/or services, and/or (2) workload assignment and/or modification based at least in part upon such feedback information and/or policies 120 and/or 120A . . . 120N.

Thus, in this embodiment, circuitry 118 may be capable of providing hardware assistance to one or more VMM (and/or centrally controlled or distributed cloud environment scheduling/management) processes (e.g., one or more scheduling/management mechanisms 121) in controlling and/or enforcing resource provisioning, allocation, and/or modification, e.g., in accordance with one or more policies. Advantageously, in this embodiment, as a result at least in part of using circuitry 118, significantly reduced and/or essentially constant amounts of CPU (and/or CPU core) processing overhead may be involved in establishing and/or maintaining the isolated computing environments and/or in providing the cloud's services. Indeed, in at least some implementations of this embodiment, the amount of such CPU processing overhead may be essentially zero. Advantageously, this may permit this embodiment to exhibit substantially improved CPU, host, and/or server performance. Further advantageously, this may permit this embodiment to scale much more easily and/or efficiently as network bandwidth, network transmission speed, and/or the number of hosts, users, and/or policies increase, without suffering from undesirably large increases in virtualization processing overhead, risk of network transmission losses, and/or processing latencies.

Further advantageously, in this embodiment, as a result, at least in part, of using circuitry 118, a known portion of all host resources in the cloud environment 102 that may be used for compute and I/O services, may be involved in establishing and/or maintaining the isolated computing environments and/or in providing the cloud's services. Advantageously, in this embodiment, the hosts 10A . . . 10N may be configured to be used by multiple users in accordance with their respective service agreements, e.g., by exposing the policies 120 and/or 120A . . . 120N to the hosts 10A . . . 10N such that enforcement of resource usage in accordance with the policies 120 and/or 120A . . . 120N may take place at the platform level "automatically" (e.g., without real time software involvement) but under local (e.g., virtual machine manager) and/or remote (e.g., cloud environment management) software control (e.g., provided at least in part by one or more mechanisms 121).

Further advantageously, as a result at least in part of using circuitry 118 for policy enforcement and to maintain isolation between the computing environments in this embodiment, this embodiment may be capable of providing real time or near real time fine granularity quality of service adjustments as workloads change in and/or among the hosts. Further advantageously, circuitry 118 in this embodiment permits integration and/or close coupling of security considerations (e.g., at the hardware level) into the both cloud environment as a whole and into the individual hosts, and individual components thereof. Advantageously, this may permit this embodiment to achieve improved functionality and/or efficiency, and/or decrease its complexity, and/or cost to operate and/or implement.

Further advantageously, in this embodiment, hardware switches 204A . . . 204N and/or 204 may permit a flexible direct hardware-based communication (in accordance with the one or more policies) with one or more of the network interface controllers 50A . . . 50N and/or other components of the cloud computing environment, instead of communicating via one or more virtual switches (vSwitches). This may vastly improve speed and efficiency of control and/or communication with the network interface controllers and/or other components, while integrating at a hardware level the enforcement of such policies in carrying out such control and/or communication.

Additionally or alternatively, in this embodiment, if all of the services and circuitry involved in implementing a given policy with respect to a packet are available, circuitry 118 may "automatically" implement that policy, and may direct the packet to or from, as appropriate, the entity (e.g., virtual memory manager and/or one or more virtual machines and/or application processes, whether controlled by the virtual memory manager or otherwise) involved in that processing. Conversely, if one or more of the services and/or circuitry involved in implementing the given policy are unavailable, the packet may undergo one or more iterations of the following: software processing in one or more protected memory spaces, and thereafter, the packet may be provided back to circuitry 118 for delivery to the appropriate entity for further processing. In the above, circuitry 118 may offload from a vSwitch process, while being under the control (at least in part) of the vSwitch process, the routing/forwarding of the packets between or among the components of system 100 involved in the above processing. The one or more hosts 10A . . . 10N involved in the above processing may expose their capabilities to the vSwitch, virtual machine manager processes, and/or one or more scheduling mechanisms (and/or other not shown controller), and the vSwitch process may expose the policies and identify the one or more respective virtual machines to process the packet on a policy basis. This may permit the one or more hosts 10A . . . 10N to implement the appropriate policies on respective packets, and/or to implement other services.

Additionally or alternatively, without departing from this embodiment, hardware and software control may co-exist, at least in part, in a hybrid mode of operation in one or more of the same platforms (e.g., hosts). In this situation, the hardware and software control mechanisms may be informed of changes in virtual machine, application, service, process etc. affinity with, placement in, assignment to, and/or execution by such platforms, platform CPU, and/or CPU cores. For example, as virtual machines are dynamically scheduled to run on a given CPU core and thereafter are removed, one or more vSwitch processes may provide timely indication thereof to the circuitry 118. Alternatively or additionally, one or more vSwitch processes may direct the circuitry 118 to control a subset of virtual machines, while another subset of virtual machines may be controlled by software. One or more vSwitch processes may notify the circuitry of the cumulative share of resources, users, virtual machines, and/or applications to be controlled by software, while allowing circuitry 118 to control the remainder thereof, in accordance with the policies 120.

Further advantageously, in this embodiment, given relative ease and speed with which changing circumstances in this embodiment may be detected (e.g., by circuitry 118) and/or policies adjusted, at least in part, to account for same, this embodiment may be capable of providing real time or near real time fine granularity for quality of service adjustments to be made to, and/or statistically accurate visibility of workloads and/or resource utilizations, as the workloads and/or utilizations change in and/or among the computing nodes. This may be especially true in cases where the adjustments to and/or visibility into such workloads and/or utilizations are to be accomplished on a per user/workload basis in adherence to the user service agreements. Further advantageously, in this embodiment, the amount of programming involved to make such adjustments may be substantially reduced and/or may be carried out by a unified, but distributed, control interface.

Other modifications are also possible. For example, depending upon the particular implementation, one or more virtual switches may be employed together with the switches 204A . . . 204N and/or 204. Also, the number, types, and/or configurations of hosts 10A . . . 10N, cloud environment 102, environments 150A . . . 150N, compute zones 260A . . . 260N, and/or servers 264A . . . 264N (and/or of components comprised therein) may vary without departing from this embodiment. Additionally or alternatively, one or more of the network interface controllers in the environment 102 may be capable of stateless offloading of protocol and/or other network connectivity processing.

Additionally or alternatively, in this embodiment, packet processing may be commence, at least in part, in hardware, but may be complemented and/or completed, at least in part, in software. For example, in this embodiment, circuitry 118 and/or one or more switches 204A . . . 204N may be capable of implementing, at least in part, one or more packet processing features and/or functions. These features and/or functions may comprise and/or be invoked via one or more physical and/or virtual functions. These one or more physical and/or virtual functions may comprise, for example, respective quality of service, security, switching, routing, and/or packet validation functions that may be associated with and/or assigned to respective packet flows, virtual machines, and/or service agreements, on a per policy, packet flow, virtual machine, and/or service agreement basis. For example, one or more switches 204A . . . 204N may maintain, at least in part, in respective private memory 202A . . . 202N one or more not shown queues, look up tables, and/or other data structures that may store and/or associate respective received packets and/or packets to be transmitted with one or more associated respective packet flows, generating and/or receiving virtual machines, services and/or processing that the packets are to undergo (or have undergone), quality of service and/or other parameters, etc. that may be specified (at least in part) in one or more policies 120A . . . 120N and/or 120. One or more switches 204A . . . 204N may identify (e.g., based at least in part upon header, encapsulation, and/or other information comprised in the respective packets, and/or one or more policies 120A . . . 120N and/or 120) the respective processing that the packets are to undergo, and may process and/or route the packets to ensure that they undergo such processing. For example, a given packet may initially undergo hardware processing (in accordance with policies 120A . . . 120N and/or 120) in one or more switches 204A . . . 204N and/or offload hardware (not shown, that may be comprised for example, in one or more resources 302A . . . 302N (e.g., one or more not shown network interface controllers). Thereafter, if appropriate, one or more switches 204A . . . 204N may route the given packet to one or more additional entities to process the given packet. For example, such one or more additional entities may comprise one or more software processes (not shown) in the one or more protected spaces 202A . . . 202N and/or in the virtual machine manager. Thereafter, the one or more switches 204A . . . 204N may directly route the given packet to its destination virtual machine or other destination entity, either within the cloud environment 102 or one or more networks 51. Advantageously, this may provide improved packet processing efficiency via hardware processing, while maintaining processing flexibility and richness via software. In this embodiment, a VM may be informed of data to be received or transmitted by, for example, (1) one or more interrupts, (2) one or more interrupts provided directly to the VM (optionally using information provided to circuitry 118 when the VM may have been scheduled to run and indicating core affinity), and/or (3) without provision of an interrupt, but e.g., using such information, and involving the VM and/or circuitry 118 checking processing queue status periodically.

Many other modifications are possible. For example, the foregoing techniques of this embodiment may be applied to use in an individual physical host in the absence of virtualization (at least with respect to the features of this embodiment). In this individual host, one or more not shown applications may serve an analogous role to that served by the one or more virtual machines in a virtualized environment.

Other modifications are also possible. For example, circuitry 118 may be capable, at least in part, of measuring the utilization of the respective resources (e.g., on a per user basis). Such measurements may be used to facilitate updating and/or modifying, at least in part, one or more respective policies and/or policies requirements of respective users. For example, one or more service providers and/or users may be notified of such measurements and/or other data generated therefrom, at least in part, to facilitate establishment of modified policies that may be better suited to actual measured utilization patterns and/or for more efficient workload placement.

Additionally or alternatively, one or more vSwitch processes may be capable, at least in part, of issuing one or more commands to circuitry 118 that may result in circuitry 118 handling, at least in part, traffic on a per flow, set of flows, VM, and/or user basis, in accordance, at least in part, with relevant policies. It may also result in circuitry 118 operating in a mode of operation in which data may be in one or more protected memory spaces, and/or one or more instructions may be executed in such spaces, to facilitate further processing of the traffic, and thereafter, the traffic may be sent to the circuitry for further processing. It may also enable a partial hardware offload mode, in which some processing of the traffic may be performed in hardware (with or without use of the protected memory), and thereafter, the traffic may be sent to the one or more vSwitch processes.

Thus, in this embodiment, various usage models are contemplated. For example, processing of traffic may be initially provided, at least in part, by hardware, and thence may be forwarded by circuitry 118 to software for further processing, and thence may be sent back to hardware for additional processing. Additionally or alternatively, the operation of this embodiment may be carried out under and/or in tight coupling to policies 120. Also additionally or alternatively, one or more protected memory spaces may be provided that may not be, at least in part, under control of one or more VMM processes. Further additionally or alternatively, circuitry 118 may be capable of permitting, at least in part, traffic and/or other data to be processed initially by software that is not part of the one or more VMM processes, prior to permitting processing by the one or more VMM processes.

Yet other modifications are possible. Accordingly, this embodiment should be viewed broadly as encompassing all such alternatives, modifications, and variations.

What is claimed is:

1. An apparatus comprising:
   circuitry to be used with a cloud computing environment, the circuitry satisfying subparagraphs (a) and/or (b):
   (a) the circuitry is to forward, in accordance with one or more policies that are based at least in part upon one or more service arrangements of the cloud computing environment, packet transmission traffic associated with at least one of at least one computing environment of the cloud computing environment and at least one network, the traffic having undergone hardware resource processing prior to being forwarded by the circuitry, the circuitry to forward the traffic to software for further processing after the traffic has undergone the hardware resource processing, and after the traffic has undergone the further processing, the circuitry is to forward the traffic back to the hardware resource processing;
   (b) the circuitry comprises one or more protected entities and one or more switches, the one or more switches being to forward the traffic to resources of the cloud computing environment in accordance with the one or more policies, the one or more entities being protected, at least in part, from control of one or more virtual machine manager processes associated with the cloud computing environment, the one or more entities being to used to provide additional processing to the traffic, the traffic to be forwarded to one or more software processes after the additional processing, and after being forwarded to the one or more software processes, the circuitry is to forward the traffic to one or more virtual machines associated with the cloud computing environment;
   wherein the circuitry comprises at least one application program interface, the at least one application program interface comprising, at least in part, embedded hardware and/or firmware, the embedded hardware and/or firmware being comprised in multiple hardware components of hosts of the cloud computing environment, the at least one application program interface being to permit programming, at least in part, of the hardware components so as to permit, at least in part, isolated computing environments to be provided in the cloud computing environment.

2. The apparatus of claim 1, wherein:
   the additional processing comprises at least one of security service processing and tunneling mechanism processing; and
   the one or more software processes comprise one or more virtual switch processes.

3. The apparatus of claim 1, wherein:
   the one or more entities comprise compute entities and memory spaces;
   the one or more switches comprise a plurality of switches;
   the circuitry also comprises programming interfaces;
   the compute entities, memory spaces, switches, and programming interfaces are comprised, at least in part, in one or more of:
   one or more host processors of one or more hosts;
   one or more chipsets of the one or more hosts; and
   one or more network interface controllers of the one or more hosts; and
   the hosts comprise virtual machines to be controlled, at least in part, by the one or more virtual machine manager processes.

4. The apparatus of claim 3, wherein:
   the programming interfaces permit, at least in part, at least one of:
   establishment, at least in part, of the one or more policies; and
   re-programming, at least in part, of the one or more policies;
   the cloud computing environment comprises the hosts; and
   the apparatus further comprises one or more scheduling mechanisms to make one or more resource utilization determinations related to the resources based at least in part upon current resource status information, resource operational characteristics, and the one or more policies.

5. The apparatus of claim 1, wherein:
   the circuitry is to establish, at least in part, based at least in part upon the one or more policies, the isolated computing environments in the cloud computing environment, the isolated computing environments to be virtually isolated from each other and also to be prevented from interfering with each other in derogation of the one or more policies.

6. A method comprising:
   using circuitry in association with a cloud computing environment, the method satisfying subparagraphs (a) and/or (b):
   (a) the method comprises forwarding via the circuitry, in accordance with one or more policies that are based at least in part upon one or more service arrangements of the cloud computing environment, packet transmission traffic associated with at least one of at least one computing environment of the cloud computing environment and at least one network, the traffic having undergone hardware resource processing prior to being forwarded by the circuitry, the circuitry to forward the traffic to software for further processing after the traffic has undergone the hardware resource processing, and after the traffic has undergone the further processing, the circuitry is to forward the traffic back to the hardware resource processing;
   (b) the circuitry comprises one or more protected entities and one or more switches, the one or more switches being to forward the traffic to resources of the cloud computing environment in accordance with the one or more policies, the one or more entities being protected, at least in part, from control of one or more virtual machine manager processes associated with the cloud computing environment, the one or more entities being to used to provide additional processing to the traffic, the traffic to be forwarded to one or more software processes after the additional processing, and after being forwarded to the one or more software processes, the circuitry is to forward the traffic to one or more virtual machines associated with the cloud computing environment;
   wherein the circuitry comprises at least one application program interface, the at least one application program interface comprising, at least in part, embedded hardware and/or firmware, the embedded hardware and/or firmware being comprised in multiple hardware components of hosts of the cloud computing environment, the at least one application program interface being to permit programming, at least in part, of the hardware components so as to permit, at least in part, isolated computing environments to be provided in the cloud computing environment.

7. The method of claim 6, wherein:
the additional processing comprises at least one of security service processing and tunneling mechanism processing; and
the one or more software processes comprise one or more virtual switch processes.

8. The method of claim 6, wherein:
the one or more entities comprise compute entities and memory spaces;
the one or more switches comprise a plurality of switches;
the circuitry also comprises programming interfaces;
the compute entities, memory spaces, switches, and programming interfaces are comprised, at least in part, in one or more of:
one or more host processors of one or more hosts;
one or more chipsets of the one or more hosts; and
one or more network interface controllers of the one or more hosts; and
the hosts comprise virtual machines to be controlled, at least in part, by the one or more virtual machine manager processes.

9. The method of claim 8, wherein:
the programming interfaces permit, at least in part, at least one of:
establishment, at least in part, of the one or more policies; and
re-programming, at least in part, of the one or more policies;
the cloud computing environment comprises the hosts; and
one or more scheduling mechanisms make one or more resource utilization determinations related to the resources based at least in part upon current resource status information, resource operational characteristics, and the one or more policies.

10. The method of claim 6, wherein:
the circuitry is to establish, at least in part, based at least in part upon the one or more policies, the isolated computing environments in the cloud computing environment, the isolated computing environments to be virtually isolated from each other and also to be prevented from interfering with each other in derogation of the one or more policies.

11. Non-transitory computer-readable memory storing one or more instructions that when executed by a machine result in performance of operations comprising:
using circuitry in association with a cloud computing environment;
wherein the operations satisfy subparagraphs (a) and/or (b):
(a) the circuitry is to forward, in accordance with one or more policies that are based at least in part upon one or more service arrangements of the cloud computing environment, packet transmission traffic associated with at least one of at least one computing environment of the cloud computing environment and at least one network, the traffic having undergone hardware resource processing prior to being forwarded by the circuitry, the circuitry to forward the traffic to software for further processing after the traffic has undergone the hardware resource processing, and after the traffic has undergone the further processing, the circuitry is to forward the traffic back to the hardware resource processing;
(b) the circuitry comprises one or more protected entities and one or more switches, the one or more switches being to forward the traffic to resources of the cloud computing environment in accordance with the one or more policies, the one or more entities being protected, at least in part, from control of one or more virtual machine manager processes associated with the cloud computing environment, the one or more entities being to used to provide additional processing to the traffic, the traffic to be forwarded to one or more software processes after the additional processing, and after being forwarded to the one or more software processes, the circuitry is to forward the traffic to one or more virtual machines associated with the cloud computing environment;
wherein the circuitry comprises at least one application program interface, the at least one application program interface comprising, at least in part, embedded hardware and/or firmware, the embedded hardware and/or firmware being comprised in multiple hardware components of hosts of the cloud computing environment, the at least one application program interface being to permit programming, at least in part, of the hardware components so as to permit, at least in part, isolated computing environments to be provided in the cloud computing environment.

12. The computer-readable memory of claim 11, wherein:
the additional processing comprises at least one of security service processing and tunneling mechanism processing; and
the one or more software processes comprise one or more virtual switch processes.

13. The computer-readable memory of claim 11, wherein:
the one or more entities comprise compute entities and memory spaces;
the one or more switches comprise a plurality of switches;
the circuitry also comprises programming interfaces;
the compute entities, memory spaces, switches, and programming interfaces are comprised, at least in part, in one or more of:
one or more host processors of one or more hosts;
one or more chipsets of the one or more hosts; and
one or more network interface controllers of the one or more hosts; and
the hosts comprise virtual machines to be controlled, at least in part, by the one or more virtual machine manager processes.

14. The computer-readable memory of claim 13, wherein:
the programming interfaces permit, at least in part, at least one of:
establishment, at least in part, of the one or more policies; and
re-programming, at least in part, of the one or more policies;
the cloud computing environment comprises the hosts; and
the operations further comprise making by one or more scheduling mechanisms one or more resource utilization determinations related to the resources based at least in part upon current resource status information, resource operational characteristics, and the one or more policies.

15. The computer-readable memory of claim 13, wherein:
the circuitry is to establish, at least in part, based at least in part upon the one or more policies, the isolated computing environments in the cloud computing environment, the isolated computing environments to be virtually isolated from each other and also to be prevented from interfering with each other in derogation of the one or more policies.

* * * * *